UNITED STATES PATENT OFFICE.

HENRY GLASS, OF GOLCONDA, ILLINOIS, ASSIGNOR TO HIMSELF, JAMES M. GLASS AND DAVID GLASS.

FLUX.

SPECIFICATION forming part of Letters Patent No. 251,570, dated December 27, 1881.

Application filed May 5, 1881. (No specimens.)

*To all whom it may concern:*

Be it known that I, HENRY GLASS, of Golconda, in the county of Pope and State of Illinois, have invented a new and Improved Flux, of which the following is a specification.

My improved flux is composed of the following ingredients, in about the proportions stated, viz: fluor-spar, ten parts; pure carbonate of lime, three parts; silex, two and one-half parts; alumina, one part; oxide of iron, two parts. These ingredients are to be thoroughly mingled and put into the smelting-furnace in the ordinary manner.

By the use of this flux a fluid slag will be formed in the furnace at a low heat, and the flux will combine with the silicate and silica in the ore at a temperature below that at which the metal will be injured by the heat or any of it lost by evaporation, and the phosphorus, carbon, sulphur, titanium, alumina, and all other impurities of the ores will also be removed. Silica and alumina are necessary ingredients of the flux, since ores which are rich enough to be worked do not contain a sufficient quantity of these elements to aid in forming the slag. The necessity of bringing the furnace to such a heat as will burn out the silicate or silica, as is now the practice, being thus obviated, (these impurities being removed by affinity,) the iron produced by the use of this flux is purer and of much better quality than that produced by the use of the ordinary limestone flux. Besides, the slag will be comparatively free of metal, thus resulting in a great saving of metal as well as of fuel.

The flux is designed to be used on all oxide and carbonate ores that contain silica, alumina, sulphur, phosphorus, and titanic acid, all of which by the joint action of the ingredients in the flux will by chemical affinity be removed and combine with the flux to form the slag. This result cannot be obtained by the use of any one or two of the ingredients, but it requires the combined action of all to make clear metal without loss. The amount of flux to be used must be determined by the quality of the ore, and will vary in particular instances.

In some grades of ore it may be necessary to add an alkali or perhaps an acid to the flux, and in some cases it may be necessary to change the proportions above mentioned, and for this reason I do not confine myself to the exact proportions and ingredients named.

Having thus fully described my invention, I claim as new and desire to secure by Letters Patent—

The herein-described flux, consisting of fluor-spar, pure carbonate of lime, silex, alumina, and oxide of iron, in about the proportions specified.

HENRY GLASS.

Witnesses:
WILLIAM V. ELDREDGE,
R. A. KIDEL.